US009613035B2

(12) United States Patent
Christofferson

(10) Patent No.: US 9,613,035 B2
(45) Date of Patent: Apr. 4, 2017

(54) ACTIVE ARCHIVE BRIDGE

(71) Applicant: Silicon Graphics International Corp., Milpitas, CA (US)

(72) Inventor: Floyd William Christofferson, Fremont, CA (US)

(73) Assignee: Silicon Graphics International Corp., Milpitas, CA (US)

( * ) Notice: Subject to any disclaimer, the term of this patent is extended or adjusted under 35 U.S.C. 154(b) by 78 days.

(21) Appl. No.: 13/831,649

(22) Filed: Mar. 15, 2013

(65) Prior Publication Data

US 2014/0279926 A1 Sep. 18, 2014

(51) Int. Cl.
G06F 17/30 (2006.01)

(52) U.S. Cl.
CPC .............. G06F 17/30073 (2013.01)

(58) Field of Classification Search
None
See application file for complete search history.

(56) References Cited

U.S. PATENT DOCUMENTS

| | | | |
|---|---|---|---|
| 7,430,513 B2 | 9/2008 | Kirkland | |
| 7,617,261 B2 * | 11/2009 | Telkowski et al. | |
| 7,672,854 B2 | 3/2010 | Kirkland | |
| 7,693,891 B2 | 4/2010 | Stokes et al. | |
| 7,774,742 B2 * | 8/2010 | Gupta | G06Q 10/06 717/100 |
| 7,831,793 B2 * | 11/2010 | Chakravarty et al. | 711/165 |
| 2007/0208788 A1 * | 9/2007 | Chakravarty | G06F 11/1451 |
| 2010/0145917 A1 | 6/2010 | Bone et al. | |
| 2013/0275653 A1 * | 10/2013 | Ranade | G06F 3/0605 711/103 |

FOREIGN PATENT DOCUMENTS

WO WO 2014/149332 9/2014

OTHER PUBLICATIONS

PCT Application No. PCT/US2014/017291 International Search Report and Written Opinion dated Jul. 11, 2014.

* cited by examiner

Primary Examiner — Belix M Ortiz Ditren
(74) Attorney, Agent, or Firm — Polsinelli LLP

(57) ABSTRACT

A primary data storage system is connected with a separate and external active archive storage system to consolidate data and allow active archive data to be managed based on primary storage system events. The primary data storage system may be managed and maintained by an external entity, and may include a manager module such as a resource manager. The active archive system may include several tiers of storage in a hierarchical storage system and logic for moving data between and among the tiers. As data processing milestones are completed or the state of data changes, in projects stored in the primary data storage system, task milestone or state change events are detected. Event detection can trigger data movement in the active archive solution. One or more software modules implementing the present invention may detect the events and trigger active archive operations based on the events.

18 Claims, 5 Drawing Sheets

ACTIVE ARCHIVE BRIDGE

BACKGROUND

Companies are creating and processing more and more data, and need a reliable means to store and access the data in order to be competitive. As a result, the data storage industry is growing quickly. Data storage providers are using many solutions for storing the ever-increasing volume of data. Currently, companies use techniques such as compression and other new storage methods to reduce the overall footprint of the data. Despite these methods, the volume of data continues to strain the capacity of many existing data storage systems and there is still a need to improve data storage techniques.

SUMMARY

The present technology connects a primary data storage system with a separate and external active archive storage system to consolidate data and allow archived data to be managed based on primary storage system events. The primary data storage system may be managed and maintained by an external entity, and may include one or more manager modules such as a resource manager. The active archive system may include several tiers of storage in a hierarchical storage system and logic for moving data between and among the tiers. As data processing task milestones are completed or the state of data changes in projects stored in the primary data storage system, milestones or state change events are detected.

Data movement can be triggered by a condition that is active, such as a placement of new or altered data that triggers a policy for data placement in one of the tiers, or it could be triggered by something passive, such as for example when a file ages to the point that it now qualifies to be move based upon the fact that no one has touched it for a certain amount of time. Event detection can trigger data movement in the active archive solution. In embodiments, one or more software modules implementing the present invention may detect the events and trigger active archive operations based on the events. The one or more modules may be located on the primary data storage system, the active archive system, and distributed over both.

In an embodiment, a method for managing archive data may begin with detecting an event associated with a data file update in a first data system. A policy associated with the event may be accessed and data may be moved between tiers in an archive storage system based on the event and according to the policy. The first data system may be remote and external to the archive storage system.

DETAILED DESCRIPTION

Figure 1:
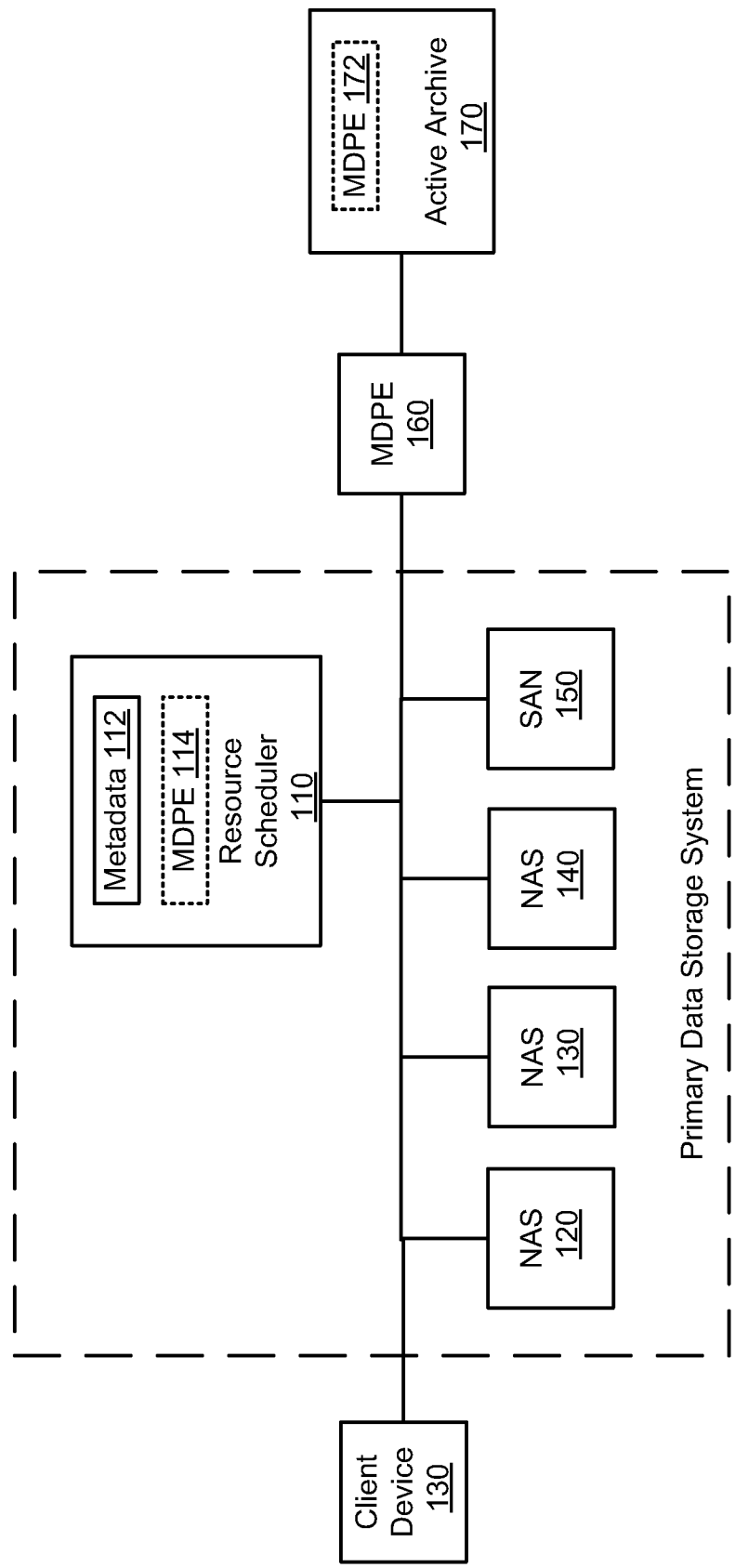
FIG. 1 is a block diagram of a resource scheduling system.

The present technology connects a primary data storage system with a separate active archive storage system to consolidate data and allow active archive data to be based on primary storage system events.

The primary data storage system may be managed and maintained by an external entity. The primary storage system may include a resource manager module or other resource or workflow scheduler which provides access to storage within the system. Administrators of the external storage system may allow customers to store projects, each project having one or more files, on the primary storage system devices. Typically, project workflow may involve a first user completing a first task by moving data—which triggers an event—within the project which changes stored data, a second user completing a change in data which triggers another event within the project, and so on. As events occur, data associated with the completed project may be idle for long periods of time but are typically maintained in the primary storage system The active archive system may include several tiers of storage in a hierarchical storage system. The first tier may provide quick access to data at a higher power and costs, and may include solid state drives or primary hard disk drive storage. One or more lower tiers may include secondary hard disk drive storage, power-managed disk arrays (MAID) storage, tape storage, cloud storage, and other types of storage devices and systems which provide slower access times but at much cheaper costs. Active archive solutions may include logic for moving data within the data storage hierarchy—moving data vertically from tier to tier or horizontally among different storage devices within a tier. Hence, when data is received from an external source, the active archive solution includes logic for storing the data at an initial tier or tiers and for determining when the data should be moved to a different tier. However, typical active archive solutions are not compatible with primary data storage systems As data processing milestones are completed or the state of data changes, for example data files remaining un-accessed and un-altered for some pre-determined period of time or other policy triggers, in projects stored in the primary data storage system, the milestone or state change events are detected. Event detection triggers data actions in the active archive solution. In embodiments, one or more software modules implementing the present invention may detect the events and trigger active archive operations based on the events. The one or more modules may be located on the primary data storage system, the active archive system, and distributed over both. The active archive operations performed in response to receipt of a trigger event may include initially storing data received from an external source, such as from primary storage, to an initial archive storage device or devices on one or more archive tiers, and applying automated policies or processing later events received by the active archive solution to move data vertically from tier to tier or horizontally among different storage devices within a tier.

FIG. 1 is a block diagram of a resource scheduling system. The resource scheduling system of FIG. 1 may operate as a primary data storage system and may include resource scheduler 110, network available storage (NAS) 120, 130, and 140, and storage area network (SAN) 150. Other hosts may include any device or system that provides a block-based storage system, file-based storage system, or object-based storage system Resource scheduler 110 may allow users of the primary data storage system to access and manipulate data stored in resources NAS 120-140 and SAN 150. A user may access and manipulate the data through a client device, such as client device 130. Users may access and change data files associated with a project. As a user changes a file of a project, the user completes a task and triggers an event and provides an indication that the task—the update or change to the file—is complete. After the user completes the task, another user may perform another task on a file within the project—which triggers another event. When a task is complete, the files that were updated, and sometimes the entire project, may be idle and left untouched for a long period of time.

Active archive system 170 may include several tiers of storage in a hierarchical storage system. A first tier may provide quick access to data at a higher power and costs and lower tiers may include MAID storage and tape storage which provide slower access times but at much cheaper costs. Active archive 170 may include logic for managing and moving data between tiers based on data retention policies but inherently does not have any knowledge regarding the status of data within the primary data storage system.

Meta-data policy engine (MDPE) 160 may communicate with resource scheduler 110, NAS-120-140, SAN 150, and active archive 170. MDPE may include one or more modules that are able to scan the primary data storage system to collect project information, retrieve event information from resource scheduler 110, and trigger data movements within active archive 170 based on events associated with completed tasks. The MDPE may be located on a device or virtual machine between the primary data storage system and active archive 170, as shown by MDPE 160. The MDPE may also be implemented in the resource scheduler 110, active archive 170, or both. For example, an MDPE module 114 of the implemented in the resource scheduler may scan for events and communicate the events to an MDPE module 172 within active archive 170.

Client device 130, resource scheduler 110, NAS-120-140, SAN 150 and active 170 may communicate via one or more private networks, public networks, WANs, LANs, an intranet, the Internet, or a combination of these networks.

Figure 2:
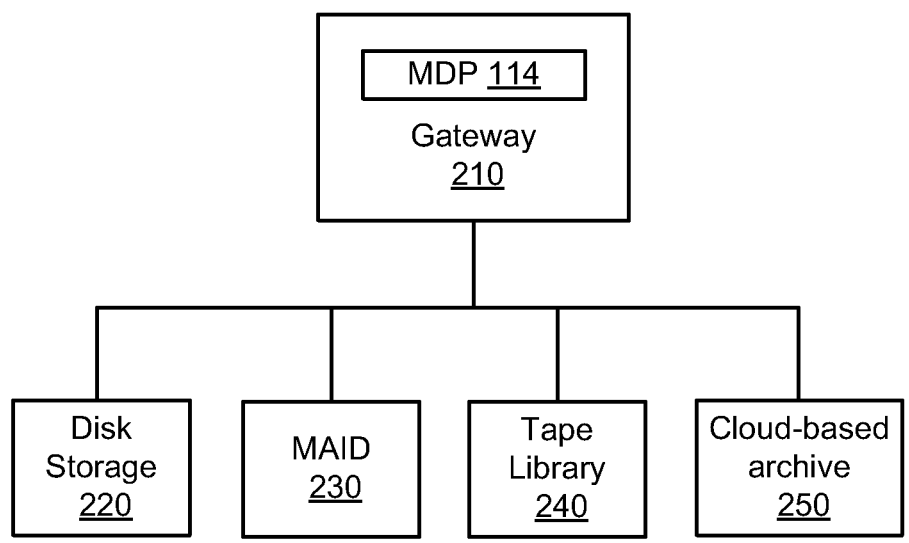
FIG. 2 is a block diagram of an active archive system.

FIG. 2 is a block diagram of an active archive system. The active archive system of FIG. 2 provides more detail for active archive 170 of the system of FIG. 1. The active archive system of FIG. 2 includes gateway 210, disc storage 220, maid 230, tape library 240 and cloud based archive 250. In embodiments, the gateway 210 may include all or a subset of downstream storage devices and systems 210-250, implemented within a single appliance or machine. Gateway 210 may include an instance of MDPE 114 and may communicate with devices configured to provide data to the active archive system. Gateway 210 may include all or a portion of the logic for moving data from one tier to another within the active archive system according to a set of retention policies. For example, the retention policies may specify that data may be moved from tier one storage to tier two or tier three storage based on how old the file is, the file name, a group ID for the file, and so on.

Disc storage 220 may form a high tier or first tier within the tiered active archive storage system. Disc storage 220 may provide fast access to data but at a higher price as compared to other storage tiers. MAID 230 may form a middle tier of the active archive system having slower access than disc storage 220 at a lower price. Tape library 240 is a lowest tier of the active archive system. Tape library 240 may store data very cheaply but with the slowest access time. Cloud based archive 250 may be used to expand the storage space of a tier 1 or tier 2 f the active archive system.

MDPE 114 may communicate with the resource scheduler 110. MDPE 114 may, for example, retrieve project file information, scan resource scheduler 110 (or other locations) for events, and may implement policy-based and other data movements within active archive storage.

Figure 3:
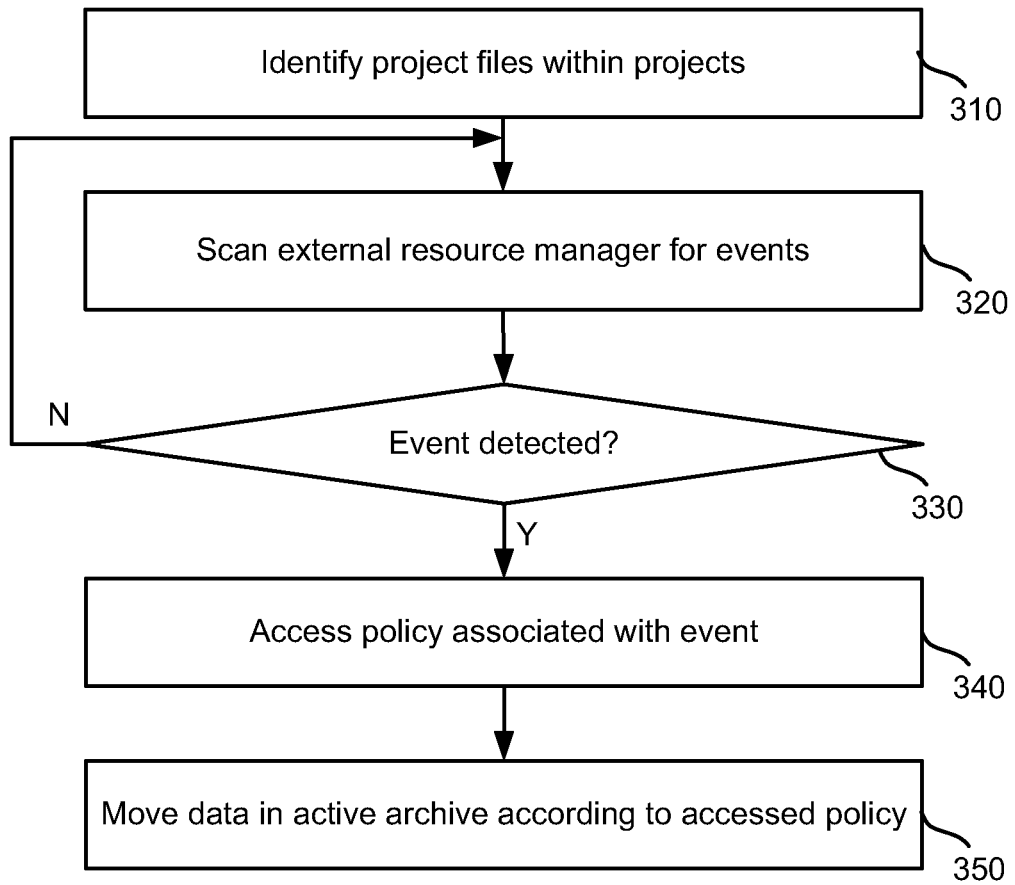
FIG. 3 is a method for archiving data based on resource scheduler events.

FIG. 3 is a method for archiving data based on resource scheduler events. The method of FIG. 3 may be performed by MDPE modules on primary data storage system, active archive 170, in between the two systems, or distributed over multiple locations. The method of FIG. 3 begins with identifying project files within projects at step 310. The project file architecture is required to move data within active archive 170 when events associated with those projects have been detected. More data regarding identifying project files within projects is discussed below with respect to FIG. 4.

Next, a resource scheduler external to the active archive 170 is scanned for events at step 320. If an event is not detected at step 330, the process of FIG. 3 returns to step 320. If an event such as a completed task event is detected within the resource scheduler, a policy associated with the event may be accessed at step 340. The policy may be stored at active archive 170, at a device implementing MDPE 160, or elsewhere. The policy may indicate how data associated with a project is to be handled within active archive 170 when a corresponding event is detected. For example, the policy may be to move a project from one location in the primary data storage infrastructure to another location within the storage infrastructure. Additionally, the policy may specify to move the data from a high tier storage type to a lower tier storage type. In any event, once an event is detected and the policy associated with the event is accessed, data is moved in the active archive according to the access policy at step 350. In embodiments, the data may be moved, copied and/or selected with the option of administrator confirmation before the move occurs at step 350.

Figure 4:
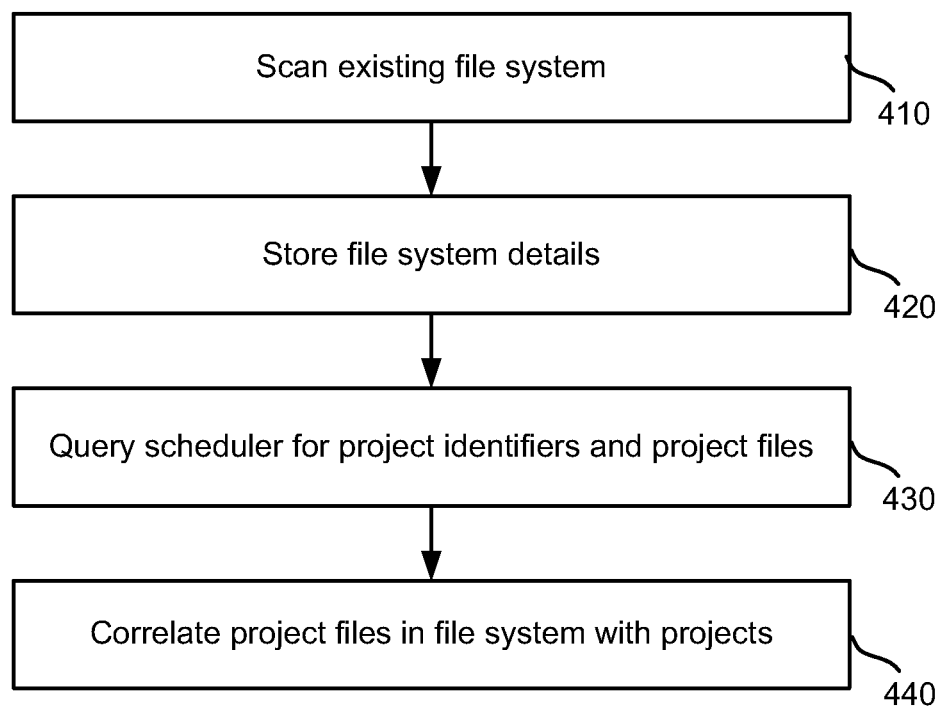
FIG. 4 is a method for correlating project files with projects.

FIG. 4 is a method for correlating project files with projects. The method of FIG. 4 provides more detail for step 310 of the method of FIG. 3. First, the existing file system of the resource scheduler is scanned at step 410. The existing file system may include the primary data storage infrastructure and files stored on the system resources, such as NAS 120-140 and SAN 150. The file system details at step 420. A scheduler may then be queried for project identifiers and project files at step 430. The project files in the file system may then be correlated with the projects at step 440. In embodiments, the file system details include file location information. The location of each file is associated with a corresponding project identifier. The location may be associated with the project, such as if it is in a project folder. But there may be occasions when a project file is also in a large collection of other files in a disorganized folder. In that case, the MDPE or the resource scheduler could be used to link files to the project. When an event is detected with a particular project, files at the locations associated with the project may be handled together in a data move from one project to another.

Figure 5:
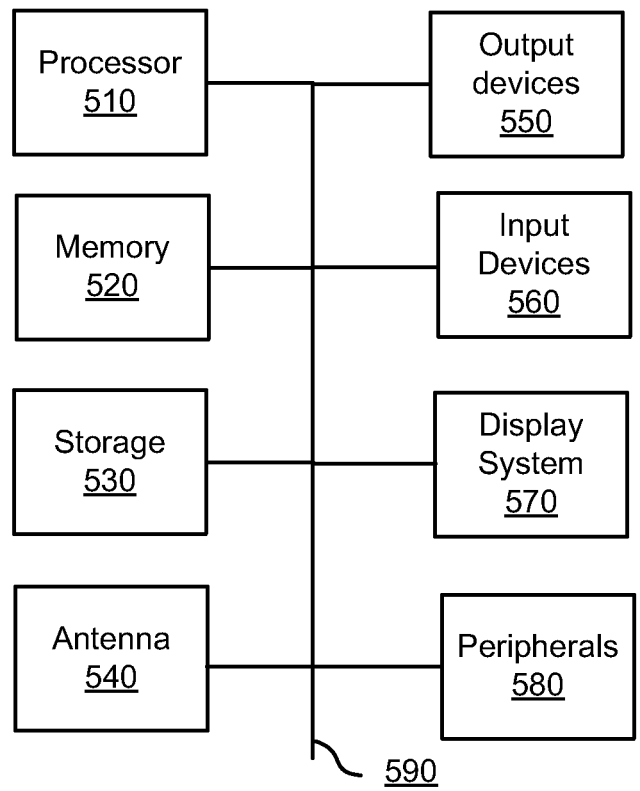
FIG. 5 is a block diagram of a device for implementing the present technology.

FIG. 5 illustrates an exemplary computing system 500 that may be used to implement a computing device for use with the present technology. System 500 of FIG. 5 may be implemented in the contexts of the likes of client devices and systems 105, 110, 120-150, 160, and 210. The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for managing archive data, the method comprising:
    allowing one or more users associated with a customer to store one or more files associated with a project of the customer in a first storage location at a primary data storage system, wherein the primary data storage system is remote from and external to an archive storage system;
    storing file system details in a file system, wherein the file system details include the first storage location of the one or more files that are associated with the project;
    associating the one or more files with a project identifier that identifies the project, wherein:
        the primary data storage system is scanned,
        a first event associated with a completed task corresponding to the one or more files is detected via the scanning of the primary data storage system, and
        the first event is associated with one or more access policies, wherein the one or more access policies correspond to the movement of the one or more files associated with the project and identified by the project identifier; and
    moving data associated with the one or more files to a first data storage tier of an archive storage system, wherein:
        the movement of the data associated with the one or more files to the first data storage tier is based on the first event being associated with the completed task and on the association of the one or more files with the project identifier,
        the data associated with the one or more files is moved between the first data storage tier and a second data storage tier in the archive storage system based on a second event and according to the one or more access policies,
        the one or more policies indicating that the data should be moved to the second data storage tier in the archive storage system after an event corresponding to the second event has occurred,
        the data moved from the first data storage tier having a first access time to the second data storage tier having a second access time,
        the second access time longer than the first access time, and
        the data is moved from the second data storage tier to a third data storage tier according to an automated policy of the one or more policies and one or more additional events regarding the data, wherein the third data storage tier is associated with a third access time that is longer than the second access time.

2. The method of claim 1, wherein the first event or the second event is associated with a completed task or a passive event.

3. The method of claim 1, wherein the first event and the second event are associated with the project.

4. The method of claim 1, wherein the first event is detected by a resource scheduler that scans the primary data storage system.

5. The method of claim 1, wherein the first policy is accessed by a module stored and executed within the archive storage system.

6. The method of claim 1, further comprising scanning the primary data storage system to identify files of the one or more files that are associated with the project.

7. A non-transitory computer readable storage medium having embodied thereon a program, the program being executable by a processor to perform a method for managing archive data, the method comprising:
- allowing one or more users associated with a customer to store one or more files associated with a project of the customer in a first storage location at a primary data storage system, wherein the primary data storage system is remote from and external to an archive storage system;
- storing file system details in a file system, wherein the file system details include the first storage location of the one or more files that are associated with the project;
- associating the one or more files with a project identifier that identifies the project, wherein:
  - the primary data storage system is scanned,
  - a first event associated with a completed task corresponding to the one or more files is detected via the scanning of the primary data storage system, and
  - the first event is associated with one or more policies; and
  - data associated with the one or more files is moved to a first data storage tier of an archive storage system,
  - the movement of the data associated with the one or more files to the first data storage tier is based on the first event being associated with the completed task and on the association of the one or more files with the project identifier,
  - the data associated with the one or more files is moved between the first data storage tier and a second data storage tier in the archive storage system based on a second event and according to the one or more policies,
  - the one or more policies indicating that the data should be moved to the second data storage tier in the archive storage system after an event corresponding to the second event has occurred,
  - the data moved from the first data storage tier having a first access time to the second data storage tier having a second access time,
  - the second access time longer than the first access time, and
  - the data is moved from the second data storage tier to a third data storage tier according to an automated policy of the one or more policies and one or more additional events regarding the data, wherein the third data storage tier associated with a third access time that is longer than the second access time.

8. The non-transitory computer readable storage medium of claim 7, wherein the first event or the second event is associated with a completed task or a passive event.

9. The non-transitory computer readable storage medium of claim 7, wherein the first event and the second event are associated with the project.

10. The non-transitory computer readable storage medium of claim 7, wherein the first event is detected by a resource scheduler that scans the primary data storage system.

11. The non-transitory computer readable storage medium of claim 7, wherein the policy is accessed by a module stored and executed within the archive storage system.

12. The non-transitory computer readable storage medium of claim 7, the program is further executable to scan the primary data storage system to identify files of the one or more files that are associated with the project.

13. A system for managing archive data, the system comprising:
- an archive data storage system having a first, second, and third data storage tier;
- a primary data storage system remote from and external to the archive data storage system, the primary data storage system including a processor and a memory, wherein one or more software executable modules are stored in the memory and executed by the processor to:
- allow one or more users associated with a customer to store one or more files associated with a project of the customer in a first storage location at the primary data storage system,
- store file system details in a file system, wherein the file system details include the first storage location of the one or more files that are associated with the project, and
- associate the one or more files with a project identifier that identifies the project, wherein:
  - the primary data storage system is scanned,
  - a first event associated with a completed task corresponding to the one or more files is detected via the scanning of the primary data storage system,
  - the first event is associated with one or more policies, wherein the one or more access policies correspond to the movement of the one or more files associated with the project and identified by the project identifier;
  - data associated with the one or more files is moved to a first data storage tier of an archive storage system according to the one or more policies and the movement of the data associated with the one or more files to the first data storage tier is based on the first event being associated with the completed task and on the association of the one or more files with the project identifier,
  - the data associated with the one or more files is moved between the first data storage tier and a second data storage tier in the archive storage system based on a second event and according to the one or more policies,
  - the one or more policies indicating that the data should be moved to the second data storage tier in the archive storage system after an event corresponding to the second event has occurred,
  - the data moved from the first data storage tier having a first access time to the second data storage tier having a second access time, the second access time longer than the first access time, and
  - the data is moved from the second data storage tier to a third data storage tier according to an automated policy of the one or more policies and one or more additional events regarding the data, wherein the third data storage tier is associated with a third access time that is longer than the second access time.

14. The system of claim 13, wherein the first event or the second event is associated with a completed task or a passive event.

15. The system of claim 13, wherein the first event and the second event are associated with the project.

16. The system of claim 13, wherein the first event is detected by a resource scheduler that scans the primary data storage system.

17. The system of claim 13, wherein the policy is accessed by a module stored and executed within the archive storage system.

18. The system of claim 13, wherein the one or more modules are further executable to scan the primary data storage system to identify files of the one or more files that are associated with the project.

* * * * *